March 24, 1953     G. H. SULLIVAN     2,632,311

INSULATED CONTAINER FOR DELIVERY OF FROZEN FOODS

Filed July 25, 1947

INVENTOR.

BY George H. Sullivan

Patented Mar. 24, 1953

2,632,311

UNITED STATES PATENT OFFICE 2,632,311

INSULATED CONTAINER FOR DELIVERY OF FROZEN FOODS

George H. Sullivan, Baldwinsville, N. Y., assignor to Frozen Food Foundation, Inc., Syracuse, N. Y., a corporation of New York Application July 25, 1947, Serial No. 763,526

5 Claims. (Cl. 62—91.5)

This invention relates to frozen food packages and, more particularly, to an insulated, reusable package or container adapted for use in the delivery of frozen foods in unrefrigerated carriers.

It will be appreciated it is difficult for retailers and similar suppliers to deliver small orders of frozen foods without incurring great expense. The cost of frozen foods at the present time is somewhat greater than the cost of similar products canned or preserved by other means; as a competitive matter, any increase in the cost of delivery militates against an increase in the consumption of frozen foods. Consequently, it is essential that retailers be able to deliver small orders of frozen foods without a great investment in equipment or containers; likewise, such delivery of frozen foods need be effected in a manner which assures arrival in satisfactory condition without deterioration.

The chief object of the present invention is to provide a package or container insulated to prevent deterioration of the foods during delivery and adapted to permit refrigeration of the foods during delivery which may be constructed economically in such manner that it is capable of being used for a large number of deliveries.

An object of the present invention is to provide an insulated, reusable, inexpensive container for use in the delivery of foods adapted to include a refrigerating material such as Dry Ice (solidified carbon dioxide) to refrigerate foods during delivery and which is so constructed as to prevent any great increase in the temperature of frozen foods contained therein during a normal delivery period.

A further object is to provide an efficient, lightweight, inexpensive container for frozen food deliveries effected in unrefrigerated carriers, the container possessing structural strength and being so designed as to assure long life and ready handling. Other objects of my invention will be readily perceived from the following description.

This invention relates to a frozen food package which comprises, in combination, an exterior container having carrying means thereon, and an interior container adapted to fit within and to be supported by the exterior container, said interior container including an outer wall member, an inner wall member forming a storage compartment, insulating material disposed between said wall members, a bottom member disposed within the interior container, insulating material disposed between the bottom member and the base of the outer wall member, and a cover member fitting within the outer wall member above the insulating material and the inner wall member. The cover member includes a rack depending therefrom; refrigerating material is disposed within the rack and suspended within the storage compartment to maintain food stored therein at a desired temperature.

The attached drawing illustrates a preferred embodiment of my invention, in which.

Figure 1:
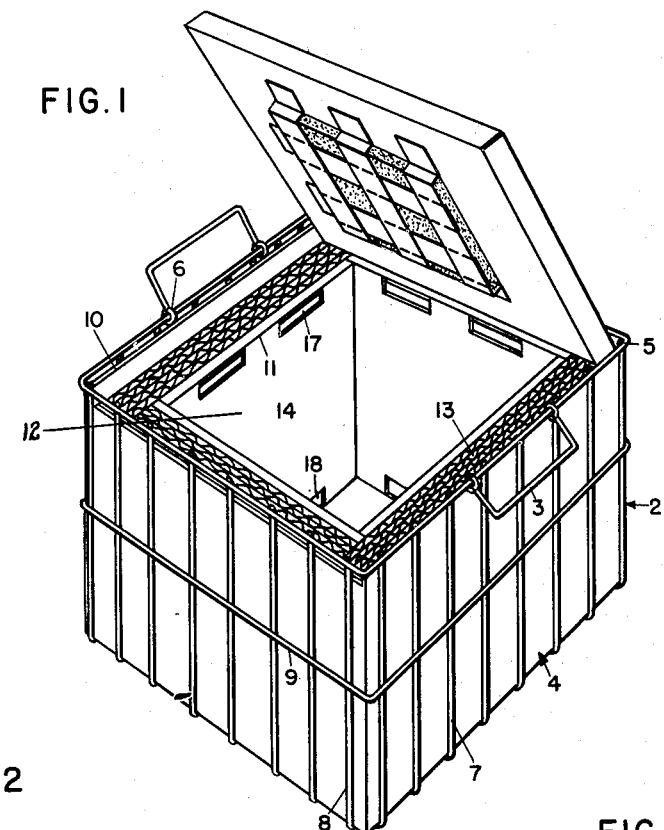
Figure 1 is an isometric view of the container of the present invention.

Referring to the drawing, there is shown an insulated, reusable package or container adapted to be used for delivering frozen foods in unrefrigerated carriers, the package consisting of an exterior container 2 having carrying means 3 thereon, and an interior container 4 adapted to fit within and to be supported by the exterior container 2.

The exterior container 2 may be in the shape of a basket formed of wires, expanded metal, or other light-weight, strong, rigid material. The container 2 includes a rim member 5 in the form of a parallelogram having handles 3, each handle consisting of a wire having its terminal portions bent into loops 6 which fit loosely about rim member 5; handles 3 may be moved about the rim member to aid in ready handling of the package. A series of bar members such as galvanized wires 7 are welded to one side of rim 5, extending downward therefrom, horizontally to the opposite side of the rim, then upward to the rim, being welded thereto. A second series of galvanized wires 8 are attached to a third side of rim 5 and extend downward therefrom, then horizontally across and in contact with the horizontally extending portions of wires 7, and upward to the fourth side of the rim 5, being welded thereto. Preferably, a wire reenforcement member 9 extends about the central portion of container 2 at a right angle to the wires 7 and 8 and is attached to at least some of the wires 7 and 8 thereby strengthening and supporting the container.

It will be appreciated, if desired, the exterior container may be provided with tapered sides to permit nesting of one container inside of another to decrease packing and shipping costs. Likewise, if desired, such container may be of a knock-down type, easily assembled when it is desired to use the same thereby providing the same advantages as provided by nested containers.

The interior container 4 includes an outer wall member 10, an inner wall member 11 forming a storage compartment 12, and a layer 13 of insulating material disposed between the wall members 10 and 11. Wall members 10 and 11 serve to protect insulating layer 13 against damage from rough handling or leakage of products in the storage compartment. Layer 13 of insulating material is disposed about the four sides of the container and at the base thereof but is not disposed at the top of the package, the top of the package being insulated as hereinafter described.

Wall member 11 is formed of a single piece of corrugated board folded or bent into an inner portion 14 defining the storage compartment 12 and an outer portion 15 adjacent the insulating material 13; portions 14 and 15 form air spaces 16 therebetween for a purpose hereinafter described. Openings or ports 17 are formed in portion 14 to connect compartment 12 with the air spaces 16 permitting flow of gas from the compartment within the air spaces. Preferably, openings 17 are formed in the upper section of portion 14 adjacent its edge; other openings 18 are formed in the lower section of portion 14.

The wall members 10 and 11 may be formed of corrugated paper or fiberboard having surfacing layers adhesively secured thereto as is customary in the industry. It will be understood such members may be treated with waterproofing compounds if desired. Insulating material 13, preferably, consists of a plurality of layers of corrugated paper or fiberboard thus providing a large number of dead air spaces which serve effectively to insulate the storage compartment from ambient atmosphere.

A false bottom member 19 is disposed at the base of storage compartment 12 within wall member 11. Insulating material 20 is disposed between bottom member 19 and the bottom portion of member 10. Member 19 is formed of a single piece of corrugated paper or fiberboard folded or bent to form a horizontally extending interior portion 21 having vertically extending flanges 22 on all sides thereof. Each flange 22 has openings 23 therein to permit passage of cold gas from the air spaces 16 within the air space 24 within the interior of bottom member 19. Members 25 and 25', resembling isosceles trapezoids in contour, extend horizontally from flanges 22 and are spaced from horizontally extending portion 21. Members 25' overlap members 25 to form the opposite wall of member 19. Flange members 26 and 26' extend vertically from members 25 and 25' toward portion 21 and form support members for bottom member 19. Opposite members 25 have slots 27 therein extending within the connected flange members 26. Flange members 26' extending from adjacent members 25' have notches 28 formed in their edges.

In assembling member 19, the flange members 26' fit within slots 27, notches 28 therein fitting over the flange members 26 thereby securely holding the member 19 in assembled position.

Figure 2:
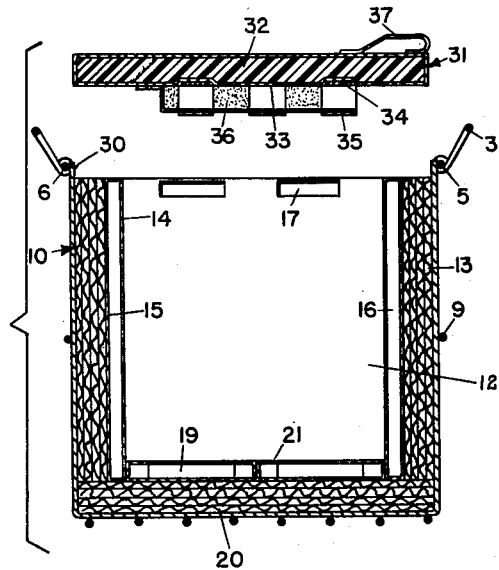
Figure 2 is an exploded sectional view through the container shown in Figure 1.
Figure 3:
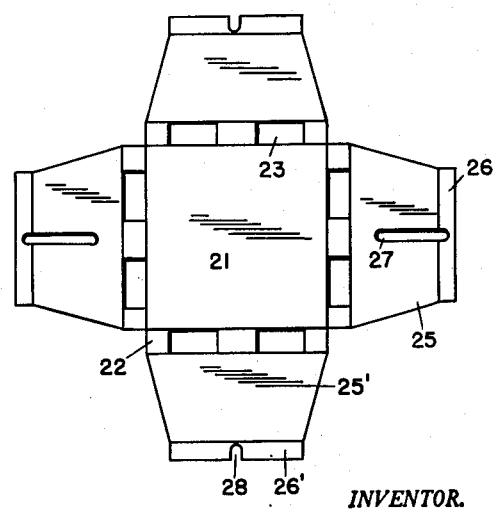
Figure 3 is a plan view of the blank from which the bottom member of the container is formed.

By reference to Figure 2, it will be noted the outer wall member 10 extends beyond inner wall member 11 and insulating material 13 as shown at 30. So extending wall 10 provides a recess adapted to receive a cover member 31 which fits snugly within wall member 10 and rests upon the inner wall member 11 and insulating material 13 which, in effect, form a shelf to receive the cover. Cover 31 closes and seals compartment 13 from the ambient atmosphere.

Cover 31 may be formed of a layer 32 of flexible, resilient insulating material such as sponge rubber or synthetic sponge rubber enclosed in a waterproof canvas layer 33. If desired, wood reenforcement or support strips or slats 34 may be placed between layer 32 and the canvas cover 33 to provide adequate strength to layer 32. A rack 35 formed of canvas straps or the like is sewed to the under side of cover 31 and is adapted to retain or hold refrigerating material 36 such as Dry Ice (solidified carbon dioxide). The refrigerating material 36 is suspended within storage compartment 12 to refrigerate foods stored therein. A canvas handle 37, preferably, is sewed to the opposite side of cover 31.

It will be appreciated as the refrigerating material 36 evaporates, the cold Dry Ice gas is permitted to flow from storage compartment 12 through openings 17 into air spaces 16 and through openings 18 and 23 within the interior of bottom member 19 thereby filling such spaces with cold gas to protect stored foods from the ambient atmosphere.

It will be observed that the container or package of the present invention is so constructed as to insulate frozen foods carried therein from the ambient atmosphere thus protecting such foods against deterioration during delivery in unrefrigerated carriers. The container so provided is inexpensive permitting its use for this purpose and is capable of being reused many times further reducing the cost involved in each delivery.

The storage compartment is surrounded on all sides by layers of insulating material and, when the package is in use, by layers of cold gas thus greatly reducing the rate of heat entry into the storage compartment and permitting foods stored therein to be maintained at low temperatures for a period of time sufficient to permit easy and ready delivery.

The container is light in weight while retaining adequate strength and rigidity for the purpose for which it is designed. The exterior container protects the inner container from rough handling, provides additional structural strength, longer life and easier handling.

The false bottom member may be readily replaced if required thus decreasing the cost of the package since the remaining elements thereof may be continued in use. The cover portion fits snugly within the container and insulates the storage compartment from ambient atmosphere as well as providing a rack to permit refrigerating material to be suspended within the storage compartment over the food to increase the rate of evolution of cold Dry Ice gas. I have found that such arrangement maintains a nearly constant food temperature adjacent 0 degrees F. until the Dry Ice has been utilized completely to provide refrigeration for the stored foods.

While I have described a preferred embodiment of my invention it will be understood my invention is not limited thereto since it may be otherwise embodied within the scope of the following claims.

I claim:

1. A frozen food package which comprises an outer wall member, an inner wall member including an inner portion forming a storage compartment, an outer portion spaced from the inner portion to form air spaces therebetween, the inner portion having openings therein connecting the compartment and the surrounding air spaces, insulating material disposed between the outer wall member and the inner wall member, a bottom member forming the base of the storage compartment, insulating material disposed between the bottom member and the outer wall member, the bottom member consisting of an inner horizontally extending portion forming the base of the storage compartment, a horizontally extending exterior portion spaced therefrom to form an air space therebetween, the exterior portion being adjacent the insulating material, vertically extending flanges having openings therein connecting the horizontally extending portions, the flange openings connecting the wall air spaces with the base air space, and reenforcement members disposed between the horizontally extending portions, a cover member of resilient insulating material closing the storage compartment, said cover member fitting within the outer wall member and resting upon the inner wall member and the insulating material, a layer of moisture-resistant fabric enclosing the cover, a rack formed of canvas straps depending from the cover, and solidified refrigerating material suspended in said rack.

2. In an insulated package for the transportation of frozen foods in unrefrigerated carriers, the combination of an outer wall member, an inner wall member including an inner portion forming a storage compartment, an outer portion spaced from the inner portion to form air spaces therebetween, the inner portion having openings therein connecting the compartment and the surrounding air spaces, insulating material disposed between the outer wall member and the inner wall member, a bottom member forming the base of the storage compartment, insulating material disposed between the bottom member and the outer wall member, a cover member closing the storage compartment, a rack depending from the cover member, solidified refrigerating material suspended in said rack, evaporation of said material cooling the storage compartment, cold gas flowing from the storage compartment through the openings in the inner portion of the inner wall member into the air spaces surrounding the compartment, said bottom member being formed of a single piece of corrugated board folded to form a horizontally extending interior portion, vertically extending flanges on all sides of the horizontally extending portion, each flange having at least one opening therein, isosceles trapezoid-like portions extending horizontally from the flanges and being spaced from the horizontally extending portion, adjacent trapezoid-like portions being adapted to overlap opposite trapezoid-like portions, flange members extending vertically from the trapezoid-like portions to the horizontally extending portion to form support members for the bottom member, opposite trapezoid-like portions having slots therein extending within the connected flange members, flange members depending from adjacent trapezoid-like portions having notches formed in their edges to permit them to fit over flange members extending from the opposite trapezoid-like portions.

3. A package according to claim 2 in which the cover member comprises a layer of flexible, resilient, insulating material enclosed in a layer of substantially moisture-resistant fabric, reenforcement members are disposed between the insulating material and the fabric layer, a rack depends from one side of the cover member into the storage compartment, and a handle is disposed on the opposite side of the cover member from the rack.

4. A package according to claim 3 in which the flexible, resilient, insulating material consists of sponge rubber; the fabric layer consists of waterproof canvas and the rack is sewed to the fabric layer.

5. A frozen food package which comprises an interior container including an outer wall member, an inner wall member forming a storage compartment, insulating material disposed between the wall members, a bottom member disposed within the interior container, insulating material disposed between the bottom member and the base of the outer wall member and a cover member fitting within the outer wall member above the insulating material and the inner wall member, said bottom member consisting of an inner horizontally extending portion forming the base of the storage compartment, a horizontally extending exterior portion spaced therefrom to form an air space therebetween, the exterior portion being adjacent the insulating material, vertically extending flanges having openings therein connecting the horizontally extending portions, reenforcement members disposed between said portions, said bottom member being formed of a single piece of corrugated board folded to form a horizontally extending interior portion, vertically extending flanges on all sides of the horizontally extending portion, each flange having at least one opening therein, isosceles trapezoid-like portions extending horizontally from the flanges and being spaced from the horizontally extending portion, adjacent trapezoid-like portions being adapted to overlap opposite trapezoid-like portions, flange members extending vertically from the trapezoid-like portions to the horizontally extending portions to form support members for the bottom member, opposite trapezoid-like portions having slots therein extending within the connected flange members, flange members depending from adjacent trapezoid-like portions having notches formed in their edges to permit them to fit over flange members extending from the opposite trapezoid-like portions.

GEORGE H. SULLIVAN.

REFERENCES CITED

The following references are of record in the file of this patent:

UNITED STATES PATENTS

| Number | Name | Date |
| --- | --- | --- |
| 557,371 | Ferguson | Mar. 31, 1896 |
| 738,301 | Dowd | Sept. 8, 1903 |
| 975,000 | Sterrett | Nov. 8, 1910 |
| 1,009,993 | Parrish | Nov. 28, 1911 |
| 1,735,082 | Martin | Nov. 12, 1929 |
| 1,843,038 | McIlvain | Jan. 26, 1932 |
| 1,866,316 | Miller | July 5, 1932 |
| 1,892,988 | Knapp | Jan. 3, 1933 |
| 1,930,680 | Hinton | Oct. 17, 1933 |
| 1,949,677 | Crawford | Mar. 6, 1934 |
| 1,986,263 | Hatch | Jan. 1, 1935 |
| 2,008,906 | Ginsberg | July 23, 1935 |
| 2,031,254 | Derr | Feb. 18, 1936 |
| 2,066,374 | Toulouse | Jan. 5, 1937 |
| 2,228,787 | Snyder | Jan. 14, 1941 |
| 2,231,981 | Zalkind | Feb. 18, 1941 |
| 2,330,345 | Elliott | Sept. 28, 1943 |
| 2,484,608 | Cheyney | Oct. 11, 1949 |